United States Patent

[11] 3,580,118

[72] Inventor Jack A. Hazel
 Northolt, England
[21] Appl. No. 776,897
[22] Filed Nov. 19, 1968
[45] Patented May 25, 1971
[73] Assignee C.A.V. Limited
 Warple Way, Acton, London, England

[54] MACHINE TOOL CUT-OFF SLIDE
 5 Claims, 2 Drawing Figs.
[52] U.S. Cl. .................................................. 82/46,
 82/24, 82/100
[51] Int. Cl. .................................................. B23b 5/14
[50] Field of Search ...................................... 82/1.4, 47,
 46, 35—37, 24, 100

[56] References Cited
UNITED STATES PATENTS
2,627,107 2/1953 Malco .......................... 82/36X Primary Examiner—Leonidas Vlachos
Attorney—Holman and Stern ABSTRACT: A machine tool for use when parting off a component from a barstock using a parting off tool and comprising a pusher member engageable with the component and arranged to apply a lateral force to the component to shear the component from the barstock when the parting off tool has machined to a predetermined depth the bridge of material forming the connection between the component and the barstock.

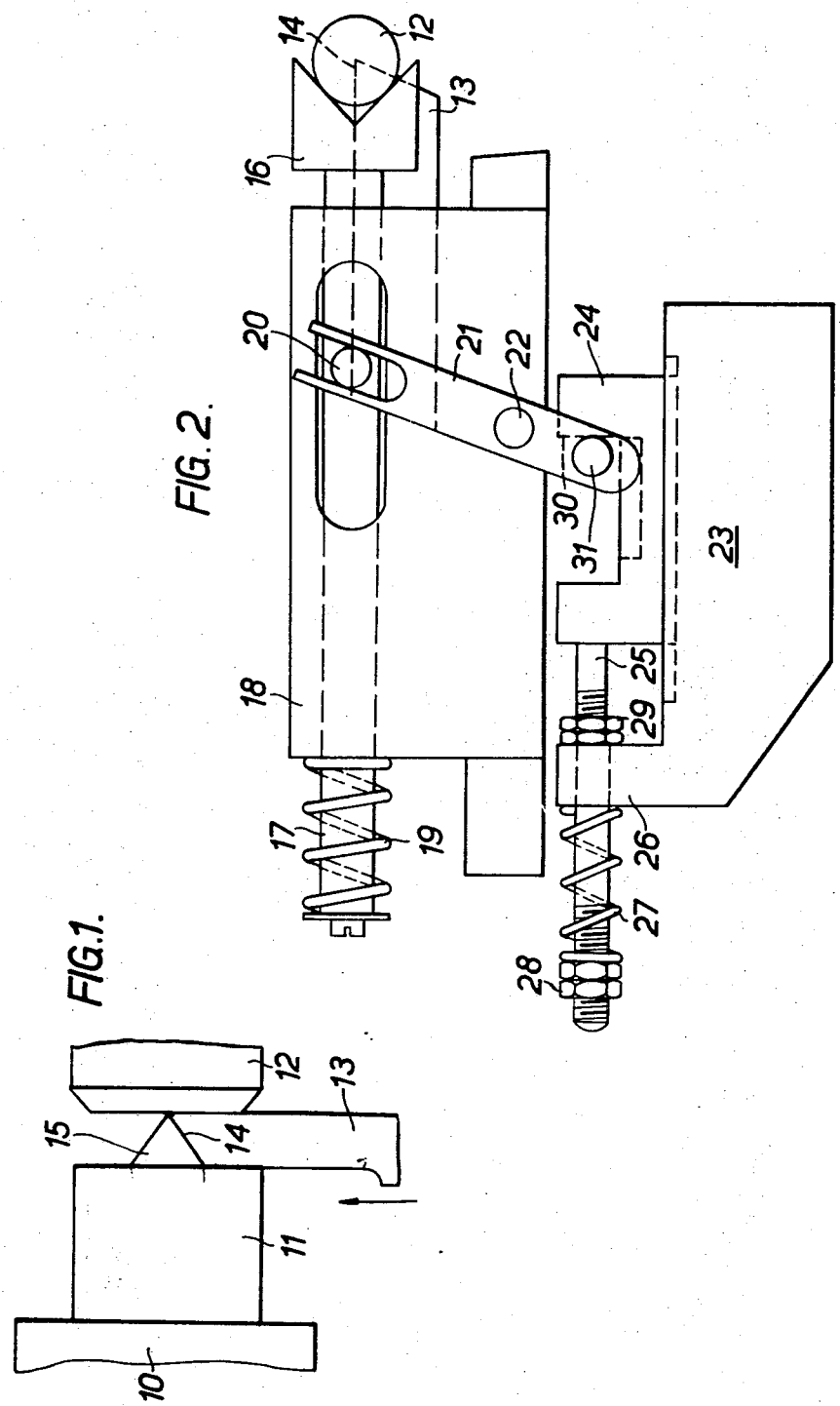

MACHINE TOOL CUT-OFF SLIDE

This invention relates to a machine tool and in particular to a machine tool for parting off a component from barstock using a parting off tool having a cutting edge formed at its leading edge, the latter being inclined to the direction of feed of the tool.

The operation of a conventional parting off tool is to cut the portion of the barstock adjacent to the component, to the shape of a truncated cone which gradually decreases in size as machining proceeds until theoretically, the component breaks off at the apex of the cone, the apex being adjacent to the component. In practice however, the base of the cone usually shears off from the barstock due to the fact that the cutting load presented by the tool is transmitted via the base of the cone and the result is that the component becomes detached from the barstock along with the cone and any swarf which is attached thereto. This means that another operation must be performed on the component to remove the cone.

A machine tool for the purpose specified comprises a pusher member for engagement with the component, means operable to move said pusher member into engagement with said component and means for applying a force to the pusher member which is transmitted to the component as a lateral force, the lateral force increasing until the component is sheared from the barstock.

One example of a tool in accordance with the invention will now be described with reference to the accompanying drawing in which:

FIG. 1 shows the conventional parting off operation and

FIG. 2 shows the apparatus additionally provided.

Referring to FIG. 1 of the drawing there is illustrated a work spindle 10 accommodating barstock 11 to which is secured a component 12 which has just been machined. The parting off tool is indicated at 13 and is provided with an inclined cutting edge 14. In operation the parting off tool is moved towards the axis of rotation of the barstock and component and a portion of the barstock adjacent to the component is machined to truncated conical form. The size of the resulting cone 15 diminishes as machining proceeds, until theoretically the component breaks off from the barstock at the apex of the cone. In practice however the cone usually shears at its base from the barstock and remains attached to the component together with any swarf which is attached to the cone. The reason for this is that the cutting load imposed by the tool is transmitted through the base of the cone which eventually shears. This is accentuated by the fact that the machining speed progressively reduces as the parting off tools moves towards the axis of rotation.

The presence of the cone together with any swarf on the component presents a problem since a further machining operation or finishing operation is necessary to remove the cone and this adds expense to the production of the component and is generally inconvenient particularly where automatic feed systems are utilized and feed the component to adjacent machines.

The principle of the present invention process and tool is to cause the component to be sheared from the cone before the latter is sheared from the barstock. With the component removed the matching process is continued to remove the cone from the barstock.

The apparatus as seen in FIG. 2 comprises a pusher member 16 which is shaped to engage the component adjacent to the end thereof where the cone will be produced. The member 16 is mounted upon one end of a rod 17 which is movable axially within a body member 18. The rod 17 is biased away from the component by the action of a coiled compression spring 19 and projecting from the rod is a peg 20 slidable within a slot formed in the body member 18. The peg is engaged by the forked end of a lever 21 pivotally mounted upon the body member at 22. The body member 18 is adapted to be clamped to the slide which carries the parting off tool 13.

Secured to the fixed part of the machine is an abutment block 23 upon which is slidably mounted a movable abutment block 24. The movable abutment block is connected to a screw-threaded rod 25 which extends with clearance through an end plate 26 of the fixed abutment block 23 and a coiled compression spring 27 is provided intermediate the plate 26 and an adjustable collar 28 mounted upon the rod 25. The rod 25 additionally carries a stop 29 to limit the movement of the movable abutment block under the influence of the spring 27.

The movable abutment block in its upper surface, is provided with a recess having an end wall 30 for cooperation with a further peg 31 projecting outwardly from the lever 21.

In operation, at the start of the parting off operation the peg 31 is clear of the end face 30 of the recess, but as the parting off operation proceeds the peg 31 moves into contact with the end face 30 and this moves the pusher member 16 into contact with the component. Further movement of the slide carrying the parting off tool causes the lever 21 to be moved in an anticlockwise direction about its pivot 22 and this imparts movement to the movable abutment 24 against the action of the spring 27. In addition, a lateral force is applied by the pusher member to the component. As machining further continues a point is reached at which the connection of the cone 15 to the component is so thin that the connection is sheared by the action of the lateral force imposed by the pusher member. As soon as the shearing action starts to occur the force exerted by the spring 27 effects movement of the movable abutment member towards the position in which it is shown and this movement is magnified by the action of the lever 21, the pivot point of which is closer to the peg 31 than to the peg 20. During this movement the pusher member moves relative to the parting off tool. Thus the component is sheared from the cone quickly and the break off is comparatively clean.

The initial position of the movable abutment block 24 determines the instant at which the pusher member starts to apply a lateral force to the component and this point can be determined by adjustment of the stop 29 upon the rod 25. The force exerted by the spring 27 can be adjusted by means of the adjustable collar 28, and in the event that the parting off tool breaks during the operation the resulting movement of the pusher member relative to the body member 18 is accommodated by compression of the spring 27 so that there will be no damage to the machine. The purpose of the spring 19 is to return the pusher member 16, the rod 17 and the lever 21 to their original positions after the parting off operation has been completed.

I claim:

1. A machine tool comprising a frame, means for rotatably supporting barstock, a movable slide carried by said frame, a parting off tool carried by said slide, said parting off tool having a cutting edge inclined to the rotary axis of said barstock and the slide being movable to cause the parting off tool to sever the barstock, a pusher member carried by said slide for engagement with the portion of the barstock to be served, said pusher member being movable relative to the parting off tool, a part secured to the movable slide, a lever pivotally mounted upon said part means pivotally connecting one end of said lever with the pusher member pin means at the other end of said lever, an abutment block, said abutment block being connected to said frame through the intermediary of resilient means, the arrangement being that after the pusher member has engaged with the portion of the barstock to be served the resilient means is tensioned during continued movement of the slide, until the lateral force applied to the component is sufficient to cause shearing of the component from the barstock.

2. A machine tool as claimed in claim 1 in which the arms of said lever are of unequal length, the shorter arm being between the pivot of the lever and said other end thereof whereby as the component barstock is sheared the pusher member moves relative to the parting off tool.

3. A machine tool as claimed in claim 2 in which the initial position of the abutment block prior to movement of the lever is adjustable.

4. A machine tool as claimed in claim 3 in which the pusher member is slidably mounted on said part and is spring loaded in a direction away from the component.

5. A machine tool as claimed in claim 4 in which the spring loading the pusher member is weaker than the spring constituting said resilient means.